United States Patent [19]
Maes et al.

[11] Patent Number: 5,256,613
[45] Date of Patent: Oct. 26, 1993

[54] PROCESS FOR REGENERATING SPENT BLEACHING EARTH

[75] Inventors: Pieter J. A. Maes, Harelbeke; Albert J. Dijkstra, Kortrijk, both of Belgium

[73] Assignee: N.V. Vandemoortele International, Kortrijk, Belgium

[21] Appl. No.: 935,975

[22] Filed: Aug. 27, 1992

[30] Foreign Application Priority Data

Aug. 28, 1991 [EP] European Pat. Off. ........ 91202192.0

[51] Int. Cl.$^5$ ............ B01J 20/34; B01J 38/30; B01J 38/38; C11B 3/10
[52] U.S. Cl. ............ 502/41; 502/40; 554/181; 554/183; 554/191
[58] Field of Search ............ 502/39–44

[56] References Cited

U.S. PATENT DOCUMENTS

| | | | |
|---|---|---|---|
| 2,409,234 | 10/1946 | Arveson | 502/41 |
| 2,458,350 | 1/1949 | Crowley, Jr. | 502/40 |
| 2,506,545 | 5/1950 | Crowley, Jr. | 502/40 |
| 2,506,552 | 5/1950 | Simpson | 502/40 |
| 4,535,065 | 8/1985 | Klein et al. | 502/40 |

FOREIGN PATENT DOCUMENTS 1171421 8/1985 U.S.S.R. .................. 502/41

*Primary Examiner*—Paul E. Konopka
*Attorney, Agent, or Firm*—Cushman, Darby & Cushman

[57] ABSTRACT

The present invention relates to a process for the regeneration of spent bleaching earth, comprising an oxidative heat treatment in which the amount of oxygen supplied exceeds the stoichiometrical requirement of complete oxidation of all organics present in the spent bleaching earth, wherein the spent bleaching earth and the oxygen are blown through a stationary fluidized bed of inert granulate material. The stationary fluidized bed should be as high as to limit the temperature in the freeboard to less than 1000° C. As a matter of fact, it has been found that, if the fluidized bed is not high enough, the oxygen required to burn off the organics content of the spent bleaching earth would blow out the powdered bleaching earth from the bed at the stage of incomplete oxidation of the organics present on the earth, resulting in an uncontrolled temperature rise in the freeboard and local overheating of the bleaching earth.

6 Claims, No Drawings

PROCESS FOR REGENERATING SPENT BLEACHING EARTH

BACKGROUND OF THE INVENTION

The present invention relates to a process for regenerating spent bleaching earth, as well as to the use of said regenerated bleaching earth for bleaching. The term spent bleaching earth as used herein is intended to describe spent bleaching earth resulting from glyceride oil, or its derivatives, or paraffine refining processes. The term glyceride oil as used herein is intended to encompass both vegetable and animal oils, in particular the so-called edible oils, i.e. oils used chiefly in foodstuffs, but it has to be understood that oils of which the end use is non-edible are to be included as well.

In edible oil refining, the bleaching process is generally considered to be of critical importance in determining the quality and stability of the final product. Although bleaching was originally intended for the removal of coloring substances from the oil, it is now recognized that this process is responsible for the removal of a whole range of impurities.

Besides decolorization, the most important purpose of this bleaching process is the removal of trace elements such as iron, copper, calcium, magnesium, nickel and phosphorus, some of which elements are known to promote oxidation of the oil and to limit the storage stability of the oil if they are not removed. These trace elements may be associated with phospholipids, but also with fatty acids in the form of soaps, especially when the oil results from caustic refining or hydrogenation. Bleaching of edible oils or fatty acids is also carried out to remove constituents that deactivate hydrogenation catalysts and thus lead to a more reproducible hydrogenation process and product, and to reduced catalyst usage.

Bleaching of edible oils generally entails mixing the oil with an appropriate amount (e.g. 0.2-2.0%) of adsorbent at increased temperature (e.g. 70°-140° C.), stirring the mixture—preferably under reduced pressure and in the absence of oxygen—and filtering e.g. through a filterpress (Bailey's Industrial Oil and Fat Products, 4th Edition, Volume 2, 1982, John Wiley & Sons, New York, pages 27 to 52).

In order to minimize oil losses, the filter cake resulting from the removal of bleaching earth from the oil stream is commonly blown with steam. By doing so, the oil content of the spent bleaching earth is reduced to 30-40 wt %. Nevertheless, the spent bleaching earth thus obtained presents a fire hazard because the oil may ignite spontaneously, especially when the oil is highly unsaturated. If disposal of this spent bleaching earth by landfill is contemplated, it must therefore be covered with earth to exclude contact with air as much as possible.

Landfill however, also presents environmental problems so that other ways of disposal of spent bleaching earth have been investigated. They usually involve introducing the spent earth into an extraction unit for edible oils or mixing the spent earth with the meal resulting from oil seed extraction. They have the disadvantage of meal adulteration and cannot be used when the spent bleaching earth contains nickel. Besides, many refineries do not have easy access to an oil crushing plant.

Accordingly, processes have been developed that aim at removal of the oil from the spent bleaching earth thereby generating an oil-free residue that can safely be disposed of by landfill. One of these processes (U.S. Pat. No. 2,706,201) involves a treatment with aqueous alkali, another (IT 532,224) involves an extraction with organic solvents and a third one the introduction of the spent earth into a biogas reactor. This last process is, however, sensitive to traces of nickel and can therefore not be used for spent bleaching earth resulting from bleaching of hydrogenated oils.

These treatments have in common that after treatment, the earth still has to be disposed of by e.g. landfill. Consequently, it is not surprising that attempts have been made to treat spent bleaching earth in such a way that a useful product results from this treatment. The easiest way to get rid of spent bleaching earth is to burn it for instance in a cement kiln to recover its energy content.

Another attempt has been described by Kazimierz Grabas, Marian Rutkowski and Bogumil Perzynski (Carbon-Mineral sorbent from spent bleaching earths, Przem. Chem., 1988, 3, 121-124), and a similar process has been disclosed in British Patent specification GB 684,036. Spent bleaching earth is heated in a multi-shelf furnace with a controlled admission of air. As a result, the oil present in the spent bleaching earth pyrolyzes and forms cracking gases and a carbon residue that coats the clay particles. The resulting carbon-mineral adsorbent can advantageously be used for e.g. the decolorisation of phosphoric acid, but not for the bleaching of edible oils or fats.

Attempts have also been made to regenerate spent bleaching earths for repeated use in the refining of edible oils.

In U.S. Pat. No. 1,851,627 a process is described wherein finely divided spent earth, such as spent bleaching earth, is treated with a suitable solvent to remove the bulk of the oil and is then mixed with a suitable quantity of water so as to form a mass which under relatively high temperature generates steam at a rate sufficient and in a sufficient quantity to make the mass porous and at the same time to decrease its density. Thereafter the mass is fed into a furnace where it is subjected to a temperature from 260° to 815° C. and then to a multiple shelf furnace where it is subjected to temperatures in the range of 371° to 871° C. in the presence of air so regulated as to secure proper combustion of the carbonaceous materials contained in the earth.

In British Patent specification No. 491,338 a method is disclosed for the regeneration of spent bleaching earths, which method comprises solvent extraction to remove the bulk of the oil and fat, steaming to remove the extraction solvent and heating the material in the presence of air to a temperature of 500° to 550° C. whilst being thoroughly stirred or agitated to facilitate uniform heating and action of the air until combustion gases are no longer evolved.

Yet another process is described in British Patent specification No. 1 278 379. In this process, spent bleaching earth is first of all extracted with an organic solvent. In a second stage, the solvent is removed from the extracted earth with steam whereupon in a third stage the desolventized earth is subjected to a partially oxidative heat treatment as a result of which the last traces of solvent are removed and organic material that had not been extracted is pyrolyzed to form a carbon deposit, whereupon, in a fourth stage, the carbon coated product is re-activated with for instance hydrochloric acid. In a fifth stage the activated product is washed with water and finally, in a sixth stage the washed product is dried. Oil is recovered from the solvent by solvent evaporation and the solvent thus recovered is recycled. The dried product can be used for bleaching edible oils and is effective in reducing oil color. However, the many stages of this process require a high investment to process relatively small amounts of spent bleaching earth.

The above methods involve the cost of solvent recovery units and anti-explosion provisions. In view of these high costs, it is not surprising that these processes have not been adopted in practice.

In U.S. Pat. No. 2,506,542 a method is disclosed involving the passage of the finely divided spent earth serially through a distilling zone wherein it is heated in the absence of oxygen to a temperature sufficient to distill off and pyrolyze constituents, a burning zone where the remaining carbonaceous constituents are burned off and a cooling zone. The adsorbent is passed through each zone as a horizontally moving bed which is maintained in a fluidized condition by the passage of a suitable gas upwardly therethrough. In each zone the mass is subjected to indirect heat transfer with a suitable heat exchange fluid. However, external heating of fluidized bed in the distilling zone and the burning zone, and the use of an inert gas free of any oxygen in the distilling zone to maintain the fluidized conditions make this process very costly, as a result of which it is hardly operated industrially if at all.

A similar method is disclosed in German Patent specification No. 1,916,692 and is said to involve two separate furnaces, the first one being heated by external heat transfer to pyrolyze the organic matter for about 90 percent, and the second furnace in which the remaining organic matter is burned off. Again, the external heating of the first furnace makes this process commercially impractical.

OBJECTS OF THE INVENTION

Therefore it is an object of the present invention to provide an alternative process for the regeneration of spent bleaching earth, which process does not entail complicated or expensive process steps.

It is a further object of the present invention to provide regenerated bleaching earth with similar bleaching activity to that of fresh bleaching earth.

It is an additional object of the invention to substantially lower glyceride oil refining costs.

It is also an object of the invention to recover at least part of the energy content of spent bleaching earth.

These and other objects or advantages of the present invention will become apparent as the description of the invention proceeds.

DETAILED DESCRIPTION OF THE INVENTION

The present invention relates to a process for the regeneration of spent bleaching earth comprising an oxidative heat treatment in which the amount of oxygen supplied exceeds the stoichiometrical requirement of complete oxidation of all organics present in the spent bleaching earth, wherein the spent bleaching earth and the oxygen are blown through a stationary fluidized bed. The stationary fluidized bed comprises a granulate inert material, such as e.g. sand, and it should be as high as to limit the temperature in the freeboard, i.e. the space above the stationary fluidized bed, to less than 1000° C.

Spent bleaching earth resulting from edible oil processing typically consists of 60% by weight inorganic material, 36% by weight organic material and 4% by weight moisture. The organic material is made up predominantly of triglyceride oil but also comprises phospholipids, free fatty acids and soaps, coloring matter and minor oil constituents. If a mixture of activated carbon and bleaching earth has been used during the bleaching process, the composition will differ from the composition given above and reflect this active carbon usage. In addition, the overall composition of spent bleaching earth may vary from refinery to refinery because of variation in steam blowing etc.

In determining the overall composition of spent bleaching earth, the moisture content is most readily determined by a Karl Fischer titration, and the inorganic material content is most readily determined as the ashing residue to constant weight using a muffle furnace at 1000° C. The organics content is then defined as everything that is neither inorganic nor moisture. The organics content arrived at in this way is usually considerably higher than the figure arrived at by solvent extraction using for instance a Soxhlet apparatus. Apparently, solvent extraction does not lead to complete removal of organics, some organics being too strongly adsorbed by the clay. This strong adsorption is also illustrated by the observation that extraction with hexane leads to a lower extraction yield than with, for instance, dichloromethane.

Determining the organics content of the spent bleaching earth to be processed according to the invention is important because it allows the minimum amount of oxygen required for complete oxidation of organics to be calculated. Since triglyceride oils and related compounds require some 90 moles of oxygen per kg and activated carbon requires 83 moles of oxygen per kg for complete combustion to carbon dioxide and water and since according to the invention an excess of oxygen is required, a requirement of 100 moles of oxygen per kg organics is to be reckoned with. This corresponds to some 11.5 m$^3$ of ambient air per kg organics.

Since bleaching earth has a high porosity the rate of burning off the organics present is not only determined by the reaction rate of the chemical distillation but also by mass transfer of gases in and out of the pores. This means that complete combustion needs some residence time even at high temperature.

This phenomenon determines the required height of the stationary fluidized bed, or the level of inert granulate material. As a matter of fact, if the stationary fluidized bed is not high enough, the air stream required to burn off the organics content of the spent bleaching earth would blow out the powdery bleaching earth from the stationary fluidized bed, at the stage of incomplete oxidation of the organics present on the earth, resulting in an uncontrolled temperature rise in the freeboard and local overheating of the bleaching earth. Temperature control has been found to be very critical because, at too high temperatures, the bleaching earth undergoes some kind of structural modification eliminating its bleaching activity.

The stationary fluidized bed comprises an inert granulate material, preferably sand, and it should be as high as to limit the temperature in the freeboard to less than 1000° C. Preferably, the height of the stationary fluidized bed is such that sufficient residence time in the stationary fluidized bed is provided to burn off almost all organics present as a result of which the temperature rise in the freeboard is limited to less than 100° C. in comparison with the temperature in the stationary fluidized bed. This modus operandi prevents the bleaching earth to be modified by too high temperatures since temperature in the stationary fluidized bed may be controlled by easy means (e.g. tubular heat exchangers). The temperature in the stationary fluidized bed preferably ranges from 350° to 700° C.

In the process according to the present invention, the spent bleaching earth to be regenerated is not critical. It may be of natural origin or synthetic such as e.g. synthetic bleaching silicates. It may be acid-activated, contain activated carbon and even have undergone a pre-treatment, although the latter, in the process according to the invention, is not strictly necessary. Such a pre-treatment may be an extraction with an apolar solvent to recover most of the triglyceride oil present in the spent earth, a treatment with water to recover some of the oil and/or a pyrolysis treatment. In such a pyrolysis treatment, the spent earth is heated in the absence or limited supply of oxygen to a temperature exceeding 300° C. at which the organics present on the spent earth are cracked to form a volatile fraction and a carbon residue. As a rough guide the carbon residue can be assumed to be about 20% by weight of the organics present in the spent earth if carbonization is allowed to proceed to completion. Pyrolysis, being slightly endothermic, requires external heat to bring the spent earth to pyrolysis temperature and for the pyrolysis to proceed. This heat can be supplied in practice by partial combustion of the pyrolysis gases through a limited supply of air. The pyrolysis gases themselves can also be fed to a burner and thus permit most of the energy content of spent bleaching earth, which is typically about 3700 kcal/kg, to be recovered.

The time required for the oxidative heat treatment depends upon the temperature during processing, upon the kind and type of bleaching earth, upon the organics content of spent bleaching earth fed to the stationary fluidized bed, upon the availability of oxygen and upon the height of the fluidized bed. It is therefore to be optimized experimentally. It has however been found that time periods of less than one second are less preferable, because the temperature required for complete oxidation of organics within this time period would be too high and result in the modification of the bleaching earth.

The fluidized bed furnace to be used in the process according to the invention is to be provided with standard dust removal systems to ensure that the combustion gases can be released into the atmosphere. It has also surprisingly been found that the activity of the bleaching earth regenerated according to the present invention is similar to or in some cases higher than the activity of fresh, acid-activated bleaching earth under normal bleaching conditions.

The invention is now illustrated by the following example:

Example 1

A sample of spent bleaching earth (Tonsil Standard, Registered trademark of Süd-Chemie A.G., München, Germany) resulting from an industrial bleaching process was analyzed. By Karl Fischer titration it was found to contain 4% moisture and on ashing the weight loss was found to be 40%. Its content of organic material was therefore 36%. The spent bleaching earth was not pre-treated and fed as such to the fluidized bed filled with sand to a certain level.

The spent bleaching earth was fed, at a throughput of 24.8 kg per hour to the fluidized bed, the static height of which was 130 cm and the cross section of which was 0.2 m$^2$. To secure complete oxidation of the organics present, air was blown through the fluidized bed at a throughput of 237 Nm$^3$ per hour, which was about twice the stoichiometrical requirement for complete oxidation of the organics. The temperature of the bed was controlled at around 730° C. and the temperature in the freeboard was found to rise to 812° C.

In a reference example, this spent bleaching earth was fed, at a throughput of 27.1 kg per hour, to the fluidized bed, the static height of which was 68 cm. Air was blown through the fluidized bed at a throughput of 227 Nm$^3$ per hour. The temperature of the bed was found to be 726° C. and the temperature in the freeboard was found to be 1074° C.

The bleaching power of these two products was compared with the bleaching power of fresh bleaching earth (Tonsil Standard) by treating samples of sunflower oil having a phosphorus content of 15.5 ppm P. In this treatment, the oil was heated to 90° C. under vacuum and dried. The vacuum was broken, 1.0 wt % of bleaching earth were added to the dried oil, vacuum was re-established and the mixture was kept at 90° C. while being agitated for 20 minutes. Subsequently, the vacuum was broken again and the bleaching earth was removed by filtration. The phosphorus content of the filtrates were determined by plasma emission spectroscopy (A. J. Dijkstra and D. Meert, J.A.O.C.S. 59 (1982), 199).

TABLE 1

| oil | P (ppm) |
| --- | --- |
| oil before bleaching | 15.5 |
| example 1 | 12.6 |
| reference example | 14.2 |
| oil bleached with fresh bleaching earth | 11.2 |

This example clearly illustrates that spent bleaching earth treated in accordance with the invention has almost the same bleaching power as fresh bleaching earth and that the height of the fluidized bed must be such as to enable the temperature in the freeboard to be limited to 1000° C.

We claim:

1. A process for regenerating spent bleaching earth particles containing organic material resulting from processing edible oil, said process comprising feeding said spent bleaching earth particles and oxygen into a fluidized bed of inert granulate material, the height of said fluidized bed being such that a sufficient residence time is provided to oxidize essentially all of said organic material and being such that the temperature in the freeboard above said fluidized bed is less than 1000° C., the amount of said oxygen fed to said fluidized bed being in excess of the stoichiometric amount required for complete oxidation of said organic material.

2. The process of claim 1 wherein the height of said fluidized bed is such that the temperature rise in the freeboard above said fluidized bed is less than 100° C. relative to the temperature of said fluidized bed.

3. The process of claim 1 wherein said inert granulate material is sand.

4. The process of claim 1 wherein the temperature is said fluidized bed ranges from 350° to 700° C.

5. The process of claim 1 wherein the amount of oxygen fed to said fluidized bed ranges from 2 to 10 times the stoichiometric amount required for complete oxidation of said organic material.

6. The process of claim 1 wherein the residence time of said spent bleaching earth particles in said fluidized bed is at least one second.

* * * * *